(12) United States Patent
Zhang

(10) Patent No.: US 11,405,762 B2
(45) Date of Patent: Aug. 2, 2022

(54) VEHICLE-TO-INFRASTRUCTURE COMMUNICATION CONTROL

(71) Applicant: Ford Global Technologies, LLC, Dearborn, MI (US)

(72) Inventor: Linjun Zhang, Canton, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 136 days.

(21) Appl. No.: 17/039,319

(22) Filed: Sep. 30, 2020

(65) Prior Publication Data

US 2022/0103988 A1    Mar. 31, 2022

(51) Int. Cl.
| | |
|---|---|
| *H04W 4/44* | (2018.01) |
| *H04W 4/021* | (2018.01) |
| *H04W 4/80* | (2018.01) |
| *H04W 40/02* | (2009.01) |
| *H04W 40/20* | (2009.01) |
| *H04W 4/12* | (2009.01) |

(52) U.S. Cl.
CPC ............. *H04W 4/44* (2018.02); *H04W 4/021* (2013.01); *H04W 4/12* (2013.01); *H04W 4/80* (2018.02); *H04W 40/026* (2013.01); *H04W 40/20* (2013.01)

(58) Field of Classification Search
CPC ......... H04W 4/44; H04W 4/80; H04W 4/021; H04W 4/12; H04W 40/026; H04W 40/20
See application file for complete search history.

(56) References Cited

U.S. PATENT DOCUMENTS

| | | | | |
|---|---|---|---|---|
| 5,019,815 | A * | 5/1991 | Lemelson | B61L 25/043 340/933 |
| 7,613,564 | B2 * | 11/2009 | Vorona | G08G 1/096775 340/995.13 |
| 10,098,014 | B1 * | 10/2018 | Shimizu | H04W 4/80 |
| 10,175,340 | B1 * | 1/2019 | Abari | G01S 13/931 |
| 10,455,540 | B2 * | 10/2019 | Balappanavar | H04W 4/44 |
| 11,126,180 | B1 * | 9/2021 | Kobilarov | B60W 30/095 |
| 2013/0083679 | A1 * | 4/2013 | Krishnaswamy | H04W 56/0035 370/252 |
| 2014/0145887 | A1 * | 5/2014 | Irvine | H01Q 3/30 343/882 |
| 2017/0111122 | A1 * | 4/2017 | Shimizu | H04W 8/005 |
| 2017/0242132 | A1 * | 8/2017 | Kim | G01S 19/05 |
| 2019/0005813 | A1 * | 1/2019 | Edlund | G08G 1/042 |
| 2019/0014446 | A1 * | 1/2019 | Gade | G08G 1/0141 |
| 2019/0020735 | A1 * | 1/2019 | Joo | H04W 4/46 |
| 2019/0098462 | A1 * | 3/2019 | Neubecker | H04W 4/06 |
| 2019/0132819 | A1 * | 5/2019 | Tseng | H04W 4/80 |
| 2019/0219661 | A1 * | 7/2019 | Maynard | G01S 5/06 |

(Continued)

*Primary Examiner* — Dominic E Rego
(74) *Attorney, Agent, or Firm* — Frank A. MacKenzie; Bejin Bieneman PLC

(57) ABSTRACT

A vehicle computer comprises a processor and a memory. The memory stores instructions executable by the processor to receive a location of a first stationary directional short-wave antenna, to determine a line from a vehicle location to the location of the first stationary antenna, to transmit a short-wave request message to the first stationary short-wave antenna based on the determined line, the message including vehicle data, and upon receiving a short-wave acknowledgment message from the first stationary short-wave antenna, to transmit a second short-wave message including vehicle data.

18 Claims, 6 Drawing Sheets

(56) References Cited

U.S. PATENT DOCUMENTS

| | | | |
|---|---|---|---|
| 2019/0238658 A1* | 8/2019 | Shimizu | H04W 4/80 |
| 2019/0325751 A1* | 10/2019 | Altintas | G05D 1/0077 |
| 2020/0312128 A1* | 10/2020 | Higuchi | G08G 1/096791 |
| 2021/0174668 A1* | 6/2021 | Sun | G08G 1/01 |
| 2022/0086609 A1* | 3/2022 | Hwang | H04W 4/38 |

* cited by examiner

VEHICLE-TO-INFRASTRUCTURE COMMUNICATION CONTROL

BACKGROUND

A vehicle can receive messages, e.g., from a stationary infrastructure element, via one or more wireless communication networks and/or protocols, e.g., providing what can be referred to as V2X communications (vehicle-to-everything communications which can include vehicle-to-vehicle and vehicle-to-infrastructure communications). Data shared via V2X communications from the infrastructure element can include data about a weather condition, traffic condition, ongoing roadside assistance, etc. It is a problem that providing data to vehicles can be prevented or impaired for various reasons.

DETAILED DESCRIPTION

Introduction

Figure 1:
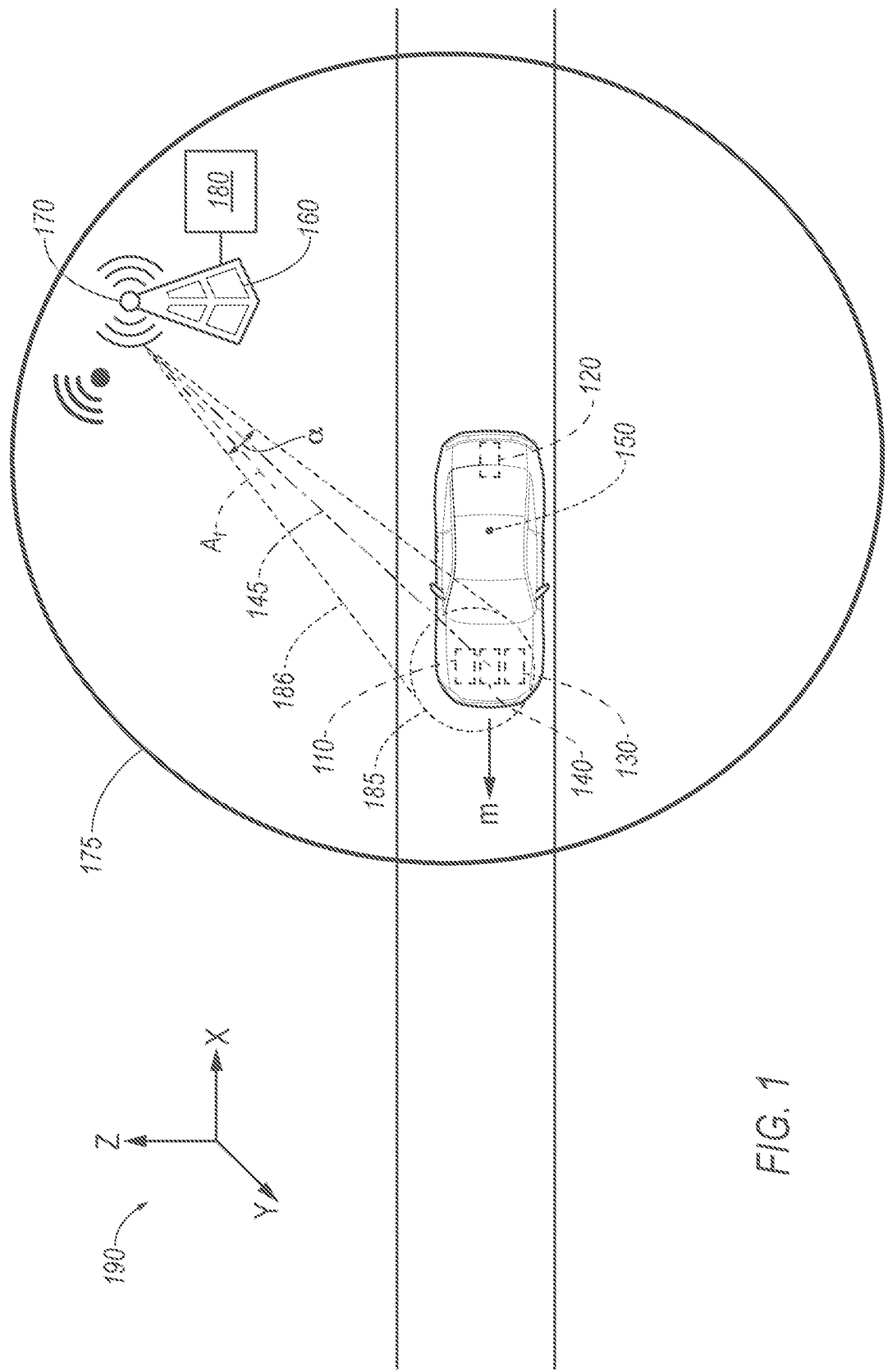
FIG. 1 is a diagram illustrating an example vehicle and an infrastructure element with a directional antenna.

Disclosed herein is a vehicle computer comprising a processor and a memory. The memory stores instructions executable by the processor to receive a location of a first stationary directional short-wave antenna, to determine a line from a vehicle location to the location of the first stationary antenna, to transmit a short-wave request message to the first stationary short-wave antenna based on the determined line, the message including vehicle data, and upon receiving a short-wave acknowledgement message from the first stationary short-wave antenna, to transmit a second short-wave message including vehicle data.

The instructions may further include instructions to receive the location of the first stationary short-wave antenna and a coverage area of the first stationary antenna via a long-wave wireless communication network, and upon determining based on the location of the first stationary short-wave antenna that the vehicle is within the coverage area of the first stationary antenna, to transmit the short-wave request message to the first stationary short-wave antenna.

The instructions may further include instructions to transmit a short-wave request message to the first stationary short-wave antenna by actuating a vehicle phased-array short-wave antenna.

The instructions may further include instructions, upon determining that the vehicle is located outside the coverage area of the first stationary antenna, to identify a second stationary antenna based on a received location of the second stationary short-wave antenna, and to determine a second line from the vehicle location to a second stationary antenna location, and to transmit a second short-wave request message to the second stationary short-wave antenna based on the second line.

The instructions may further include instructions upon determining that vehicle data include forwarding data, wherein the forwarding data include location coordinates of a second vehicle as a receiver of the forwarding data, to transmit a short-wave message to the second vehicle in a direction extending from the vehicle location to a second vehicle location.

The vehicle data may include a vehicle location, a vehicle trajectory of movement, and a vehicle status.

Further disclosed herein is a system comprising a processor and a memory. The memory stores instructions executable by the processor, upon receiving a first short-wave request message from a vehicle within a coverage area of a first stationary short-wave antenna, to transmit a second short-wave acknowledge message to the vehicle based on a vehicle location, to predict a second location of the vehicle based on a vehicle location and a vehicle trajectory, to transmit a third short-wave message to the vehicle based on the predicted second location of the vehicle, upon determining that a line extending from a first stationary short-wave antenna location to a vehicle location is blocked, to identify a message path from the first stationary short-wave antenna to the vehicle location via a second vehicle, and to transmit the third message to the second vehicle including an identifier of the vehicle, a number of hops between the vehicle and the first stationary short-wave antenna, and a payload.

The instructions may further include instructions to transmit the acknowledge message based on a vehicle location and a trajectory of the vehicle.

The instructions may further include instructions, upon detecting a blockage along the line from the first stationary antenna to the vehicle, to identify the routing path based at least in part on dimensions including a length and a height, and a location of a blocking object.

The instructions may further include instructions to determine that the routing path further includes a third vehicle in addition to the second vehicle upon determining a second line from the second vehicle to the vehicle is blocked.

The instructions may further include instructions to transmit data including map data or software update to the vehicle while updating a direction of the first stationary antenna based on a vehicle trajectory.

The instructions may further include instructions to adjust a direction of the first stationary antenna based on the imaginary line by actuating a phased array antenna included in the first stationary antenna.

The instructions may further include instructions to receive trajectory data via the short-wave message from the vehicle and to determine an angle of transmission for the vehicle based on the received trajectory data.

The instructions may further include instructions to determine the angle of transmission based on interpolation of data included in the received trajectory data.

The coverage area of the first stationary antenna may be determined based on a location of the first stationary antenna and a field of view of the first stationary antenna.

The system may further include a long-wave antenna, wherein the instructions may further include instructions to broadcast a location of a first stationary directional short-wave antenna.

The instructions may further include instructions to actuate a second stationary short-wave antenna to transmit a short-wave message to the vehicle upon determining that the vehicle has entered a second station antenna coverage area.

Further disclosed herein is a system, comprising a vehicle computer, programmed to receive a location of a first stationary directional short-wave antenna, to determine a line from a vehicle location to the location of the first stationary antenna, to transmit a short-wave request message to the first stationary short-wave antenna based on the determined line, the message including vehicle data, and upon receiving a short-wave acknowledgment message from the first stationary short-wave antenna, to transmit a second short-wave message including vehicle data. The system further includes a stationary computer, programmed, upon receiving a first short-wave request message from a vehicle within a coverage area of a first stationary short-wave antenna, to transmit a second short-wave acknowledge message to the vehicle based on a vehicle location, to predict a second location of the vehicle based on a vehicle location and a vehicle trajectory, to transmit a third short-wave message to the vehicle based on the predicted second location of the vehicle, upon determining that a line extending from a first stationary short-wave antenna location to a vehicle location is blocked, to identify a message path from the first stationary short-wave antenna to the vehicle location via a second vehicle, and to transmit the third message to the second vehicle including an identifier of the vehicle, a number of hops between the vehicle and the first stationary short-wave antenna, and a payload.

Exemplary System Elements

An infrastructure element can broadcast messages via wireless communication networks and/or protocols, e.g., vehicle-to-everything (V2X) communications, within an infrastructure element coverage area, e.g., within a range of a radio frequency (RF) transmitter, e.g., 1000 meters (m) from the infrastructure element location.

An infrastructure element may include a short-wave or millimeter wave (mmWave or mmW) antenna which directs the broadcast signal from the infrastructure element to a vehicle within the coverage area of the infrastructure element. A vehicle computer may be programmed to receive a location of a first stationary directional short-wave antenna, to determine a line from a vehicle location to the location of the first stationary antenna, to transmit a short-wave request message to the first stationary short-wave antenna based on the determined line, the message including vehicle data. The vehicle computer may be programmed, upon receiving a short-wave acknowledgement message from the first stationary short-wave antenna, to transmit a second short-wave message including vehicle data.

An infrastructure computer may be programmed, upon receiving a first short-wave request message from a vehicle within a coverage area of a first stationary short-wave antenna, to transmit a second short-wave acknowledge message to the vehicle based on a vehicle location, to predict a second location of the vehicle based on a vehicle location and a vehicle trajectory, and to transmit a third short-wave message to the vehicle based on the predicted second location of the vehicle. The infrastructure computer may be programmed, upon determining that a line extending from a first stationary short-wave antenna location to a vehicle location is blocked, to identify a message path from the first stationary short-wave antenna to the vehicle location via a second vehicle, and to transmit the third message to the second vehicle including an identifier of the vehicle, a number of hops (computers that receive and forward the data along the routing path) between the vehicle and the first stationary short-wave antenna, and a payload.

FIG. 1 illustrates a vehicle 100 and an infrastructure element 160. Although FIG. 1 shows only one infrastructure element 160, as discussed with reference to FIG. 2, more than one infrastructure elements 160 may be located in an area, e.g., a city, a neighborhood, a road section, etc.

The vehicle 100 may be powered in a variety of ways, e.g., with an electric motor and/or internal combustion engine. The vehicle 100 may be a land vehicle such as a car, truck, etc. Additionally or alternatively, a vehicle 100 may be a drone, a robot, etc. Additionally or alternatively, the vehicle 100 may include a bicycle, a motorcycle, etc. A vehicle 100 may include a computer 110, actuator(s) 120, sensor(s) 130, and a V2X antenna 170. A reference point 150 such as a geometrical center point 150 can be specified for a vehicle 100, e.g., a point at which respective longitudinal and lateral centerlines of the vehicle 100 intersect.

The computer 110 includes a processor and a memory such as are known. The memory includes one or more forms of computer-readable media, and stores instructions executable by the computer 110 for performing various operations, including as disclosed herein.

The computer 110 may operate the respective vehicle 100 in an autonomous, a semi-autonomous mode, or a non-autonomous (or manual) mode. For purposes of this disclosure, an autonomous mode is defined as one in which each of vehicle 100 propulsion, braking, and steering are controlled by the computer 110; in a semi-autonomous mode the computer 110 controls one or two of vehicles 100 propulsion, braking, and steering; in a non-autonomous mode a human operator controls each of vehicle 100 propulsion, braking, and steering.

The computer 110 may include programming to operate one or more of vehicle 100 brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

The computer 110 may include or be communicatively coupled to, e.g., via a vehicle 100 communications bus as described further below, more than one processor, e.g., controllers or the like included in the vehicle for monitoring and/or controlling various vehicle controllers, e.g., a powertrain controller, a brake controller, a steering controller, etc. The computer 110 is generally arranged for communications on a vehicle communication network that can include a bus in the vehicle such as a controller area network (CAN) or the like, and/or other wired and/or wireless mechanisms.

Via the vehicle 100 network, the computer 110 may transmit messages to various devices in the vehicle and/or receive messages from the various devices, e.g., an actuator 120, etc. Additionally or alternatively, in cases where the computer 110 actually comprises a plurality of devices, the vehicle 100 communication network may be used for communications between devices represented as the computer 110 in this disclosure. Further, as mentioned below, various controllers and/or sensors may provide data to the computer 110 via the vehicle communication network.

The vehicle 100 actuators 120 are implemented via circuits, chips, or other electronic and or mechanical components that can actuate various vehicle subsystems in accordance with appropriate control signals as is known. The actuators 120 may be used to control braking, acceleration, and steering of a vehicle 100.

The sensors 130 may include a variety of devices such as are known to provide data to the computer 110. For example, the sensors 130 may include Light Detection And Ranging (LIDAR) sensor(s) 130, etc., disposed on a top of the vehicle 100, behind a vehicle 100 front windshield, around the vehicle 100, etc., that provide relative locations, sizes, and shapes of objects surrounding the vehicle 100. As another example, one or more radar sensors 130 fixed to vehicle 100 bumpers may provide data to provide locations of the objects, second vehicles 100, etc., relative to the location of the vehicle 100. The sensors 130 may further alternatively or additionally include camera sensor(s) 130, e.g. front view, side view, etc., providing images from an area surrounding the vehicle 100.

The vehicle 100 may determine a location, e.g., GPS (Global Positioning System) location coordinates, of the vehicle 100 relative to a coordinate system 190, e.g., based on data received from a vehicle 100 GPS sensor 130. Additionally, the computer 110 may be programmed to determine a direction of the vehicle 100 movement, e.g., based on data received from the GPS sensor 130. The vehicle 100 computer 110 may be programmed to determine a vehicle 100 location and/or direction movement with respect to a coordinate system, e.g., a Cartesian coordinates system 190, based on data received from the vehicle 100 GPS sensor 130, yaw sensor 130, etc. The computer 110 may be programmed to broadcast the vehicle 100 location and/or direction of movement via a V2X to other vehicles 100 and/or an infrastructure element 160.

The vehicle 100 computer 110 may be programmed to determine a vehicle 100 trajectory m based on the determined vehicle 100 location, vehicle 100 direction of movement, vehicle 100 speed, vehicle 100 acceleration, etc. A trajectory m may be specified as a straight line on a road surface or a curved line, e.g., specified with a second degree polynomial expression $ax^2+bx+c=0$, which estimates a path of vehicle 100 from a current vehicle 100 location to a second location that is some distance, e.g., 50 meters away, from the current location of the vehicle 100. The computer 110 may be programmed to determine the trajectory m of the vehicle 100 by determining the parameters a, b, and c. Additionally or alternatively, the trajectory m may be specified by a set of waypoints of the vehicle 100, as shown in Equation (1) below, at times $t_1, t_2, \ldots, t_n$. In one example, the times $t_1, t_2, \ldots, t_n$ may be specified with respect to a time of receiving the trajectory m or with respect to a specified time reference, e.g., GPS time clock.

$$m=\{(t_1,x_1,y_1,z_1),(t_2,x_2,y_2,z_2), \ldots ,(t_n,x_n,y_n,z_n)\} \quad (1)$$

The computer 110 may be configured for communicating through a wireless communication interface 140 with other vehicles 100, an infrastructure element 160, etc., e.g., via a vehicle-to-vehicle (V2V), a vehicle-to-infrastructure (V-to-I) communication, and/or a vehicle-to-everything (V2X) communication network (i.e., communications that can include V2V and V2I). The communication interface 140 may include elements for sending (i.e., transmitting) and receiving radio frequency (RF) communications, e.g., chips, antenna(s), transceiver(s), etc.

The communication interface 140 represents (i) a long-wave communication mechanism based on exemplary V2X communication protocols such as cellular, IEEE 802.11, dedicated short-range communications (DSRC), and/or wide area networks (WAN), and (ii) a short-wave or mmWave communication mechanism with wavelengths from 1 to 10 millimeters (mm). In one example, a vehicle 100 communication interface 140 may include a first antenna, e.g., cellular antenna, for a long-wave communication, and a second antenna for short-wave communication. A frequency allocated for DSRC as one example of long-range communication is typically 5.9 GHz, i.e., having a wavelength about 5 centimeter (cm). As another example of long-range communication, Wi-Fi operates at 2.4 Gigahertz (GHz) having a wavelength about 12.5 cm. The frequency range of mmWave is typically from 110 to 300 GHz, i.e., having a wavelength range between 2.73 mm and 1 mm.

The vehicle 100 computers 110 may communicate with other vehicles 100 and/or infrastructure element(s) 160, and may utilize one or more of wireless communication mechanisms, e.g., a communication interface 140, including any desired combination of wireless and wired communication mechanisms and any desired network topology (or topologies when a plurality of communication mechanisms are utilized). A V2X communication network may have multiple channels, each identified by an identifier, e.g., channel number.

An infrastructure element 160 may include an antenna 170 and a computer 180. The computer 180 may be located at an infrastructure element 160 location and/or at a second location communicatively connected to the infrastructure element 160 via a wired and/or wireless communication network. The antenna 170 includes a short-wave antenna for establishing short-wave communication with other computers, e.g., in vehicles 100.

The infrastructure computer 180 includes a processor and a memory such as are known. The memory includes one or more forms of computer-readable media, and stores instructions executable by the computer 180 for performing various operations, including as disclosed herein. The computer 180 may be configured for communicating through one or more antennas 170 with vehicles 100 via a V2X communication protocol, e.g., short-wave communication. Additionally or alternatively, an infrastructure computer 180 may include a dedicated electronic circuit including an ASIC that is manufactured and/or configured for a particular operation, e.g., communicating with vehicle(s) 100. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included inside a chip packaging.

An infrastructure element 160 may include chips, antenna(s), transceiver(s), etc. The infrastructure element 160 may have a specified communication coverage area 175. A coverage area 175, in the present context, is an area in which the infrastructure element 160 can communicate with another computer, e.g., a vehicle 100 computer 110, etc., via a short-wave communication. A communication range of a long-wave communication (not shown) is typically larger than a coverage area 175 for short-wave communication. Dimensions and/or a shape of the area 175 are typically based on a communication technique, communication frequency, communication power, etc., of the infrastructure element 160 as well as environmental features (i.e., an arrangement of natural and artificial physical features of an area), a topography (i.e., changes in elevation), etc., of the area 175, etc.

In one example, a coverage area 175 is circular and surrounds a location of the infrastructure element 160 with a diameter that is a range of short-wave communications, e.g., 1000 meters (m). In another example (not shown), an area 175 may be oval-shaped and centered at the location of the infrastructure element 160. A location and dimensions of a coverage area 175 may be specified with respect to a coordinate system, e.g., a Cartesian coordinate system 190. In a Cartesian coordinate system 190, coordinates of points may be specified by X, Y, and Z coordinates. X and Y coordinates, i.e., horizontal coordinates, may be global positioning system (GPS) coordinates (i.e., lateral and longitudinal coordinates) or the like, whereas a Z coordinate may specify a vertical component to a location, i.e., a height (or elevation) of a point from a specified horizontal plane, e.g., a sea level.

The infrastructure element 160 is typically permanently fixed at, i.e., does not move from, a location in an area 175, e.g., an infrastructure element 160 can be mounted to a stationary object such as a pole, post, road overpass, sign, etc. One or more vehicles 100 may be within the coverage area 175 of the infrastructure element 160. A coverage area 175 may include road(s) that are two-way or one-way, intersections, parking areas, etc.

The infrastructure element computer 180 may be programmed to transmit, via the wireless network, V2X messages including data such as weather data, road conditions, software updates, HD (high definition) maps, etc. A message typically includes a header and a payload. A header may include a timestamp specifying a time of sending the message, a message source identifier, etc. The payload may include SPAT (Signal Phase and Timing) data for a traffic signal, map data (i.e., describing roads and possibly also landmarks such as bridges, buildings, etc., including describing lanes in and/or around an intersection, lanes in a road section, types of road, restrictions of lanes, etc.), road users detected by the infrastructure, and/or other data.

The infrastructure element 160 typically includes a directional short-wave antenna 170 for broadcasting messages via the V2X communication network and may transmit radio waves. The infrastructure element 160 may additionally include a long-wave antenna 170 for, e.g., cellular, WAN, Wi-Fi, etc., communication. Additionally or alternatively, a long-wave antenna may have a coverage area including the coverage area 175 of the infrastructure element 160. A coverage area 175 of the infrastructure element 160 is an area on the ground surface in which a receiver such as a vehicle 100 communication interface 140 would receive transmitted messages.

With continued reference to FIG. 1, the infrastructure computer 180 may be programmed to adjust a field of view 185 of the directional short-wave antenna 170 to communicate with, e.g. a vehicle 100 computer 110, at a location within the field of view 185. A field of view 185 may be specified by (i) a view angle α (or width angle α) of the radiation pattern 186, and (ii) an angle of the directional antenna 170 axis on the ground surface relative to a reference line, e.g., the X axis of the coordinate system 190. An antenna 170 radiation pattern 186 may have a shape of a cone, pyramid, etc. In the present context, an area on the ground surface where the radiation pattern 186 of the antenna 170 reaches, is the field of view 185 of the antenna 170. Thus, a field of view 185 is a portion of the coverage area 175 in which a short-wave communication with the infrastructure element 160 can be established. The axis $A_t$ is an imaginary line specifying a center axis of the radiation pattern 186 of, e.g., an axis of a cone-shaped radiation pattern 186 of the antenna 170, in a direction of maximum signal strength for the directional antenna 170. The view angle α, e.g., 20 degrees, specifies an angular area of a radiation pattern 186 of the directional antenna 170. Conventional techniques can be used to determine a radiation pattern 186 of an antenna 170. The view angle α may be based on shape, type, and/or operating frequency of the antenna 170.

As shown in FIG. 1, the computer 180 may be programmed to communicate via the short-wave antenna 170 and the vehicle 100 communication interface 140, to a vehicle 100 located within the field of view 185 of the short-wave antenna 170. For example, the computer 180 may be programmed to change the field of view 185 by actuating an electromechanical actuator, e.g., a motor, mechanically coupled to the antenna 170 to move the antenna 170 axis $A_t$ relative to the infrastructure element 160.

In another example, the infrastructure element 160 may include a phased-array antenna 170. The computer 180 may be programmed to change the field of view 185 of the phased-array short-wave antenna 170 by actuating the phased-array antenna 170 to change a direction of the axis $A_t$. Thus, without a mechanical, i.e., physical, movement of the phased-array antenna 170, the field of view 185 of a phased-array antenna 170 may be controlled by the computer 180. Additionally or alternatively, the vehicle 100 communication interface 140 may include a phased-array antenna, and/or a mechanical actuator to move a vehicle 100 antenna, to communicate with the infrastructure element 160.

A vehicle 100 computer 110 can be programmed to receive a location of a first stationary directional short-wave antenna 170, e.g., via a long-wave communication such as DSRC, WAN, etc., from a remote computer. The received data may include (i) location coordinates of the infrastructure element 160, e.g., with respect to the coordinate system 190, and/or (ii) a coverage area 175 of the infrastructure element 160. Data specifying the coverage area 175 may specify boundaries of the area 175, e.g., including a location of a center of a circular coverage area 175 and a diameter of the circular area 175.

The computer 110 can be programmed to determine a line of communication 145 (or line of transmission) from a vehicle 100 location to the location of the first stationary antenna 170. In one example, the line 145 is a line on the ground surface from a location of a projection of the vehicle 100 reference point 150 on the ground surface to a location of a projection of the infrastructure element 160 antenna 170 on the ground surface. The computer 110 may estimate the line 145 by determining parameters m and c of a linear equation Y=mX+c. X and Y represent longitudinal and lateral location coordinates with respect to the coordinate system 190.

In another example, the computer 110 may be programmed to implement Equations (2)-(3) below to determine a horizontal angle $\theta_h$ and a vertical angle $\theta_v$ of the line 145 with to a reference line on the ground surface and a reference line perpendicular to the ground surface. In the present description, lower-case x, y, z represent location coordinates of the vehicle 100, and upper-case X, Y, Z represent location coordinates of the infrastructure element 160. The function arctan 2 yields an angle in a Euclidean plane, given in radians, between an x axis of a Cartesian coordinate system with an origin at the communication interface 140 and a line to a point, e.g., stationary antenna 170.

$$\theta_h = \arctan 2(Y-y, X-x) \quad (2)$$

$$\theta_v = \arctan 2(Z-z, \sqrt{(X-x)^2 + (Y-y)^2}) \quad (3)$$

In order to direct the vehicle 100 communication interface 140 antenna to the infrastructure element 160 antenna 170, the computer 110 may be programmed to actuate a vehicle 100 communication interface 140 phased-array short-wave antenna based on the determined horizontal and vertical angles $\theta_h$, $\theta_v$. Additionally or alternatively, the computer 110 may be programmed to actuate a vehicle 100 actuator 120 to direct the antenna to the infrastructure element 160 based on horizontal and vertical angles $\theta_h$, $\theta_v$.

The computer 110 can be programmed to transmit a short-wave request message to the first stationary short-wave antenna 170 based on the determined line 145. The request message may include, e.g., (i) certificate data stored in a computer 110 memory, e.g., generated by a remote computer at a security credential management system (SCMS) which is a basis for permitting a short-wave communication with an infrastructure element 160, (ii) a basic safety message (BSM) that includes current vehicle 100 state, e.g., location coordinates, trajectory m, speed, etc., and/or dimensions, e.g., length, width, height, of the vehicle 100, (iii) a planned future trajectory of the vehicle 100, and/or (iv) a vehicle 100 status including a braking status, diagnostics status, etc.

The computer 110 can be programmed, upon receiving a short-wave acknowledgment message from the first stationary short-wave antenna 170, to transmit a second short-wave message including vehicle 100 data, e.g., a current vehicle 100 trajectory m, a planned route, etc.

The computer 110 may be programmed, upon determining that the vehicle 100 is within a distance of the location of the first stationary short-wave antenna 170 and therefore is within the coverage area 175 of the first stationary antenna 170, to transmit the short-wave request message to the first stationary short-wave antenna 170. For example, the computer 110 may determine that the vehicle 100 is within a circular coverage area 175 of the infrastructure element 160 upon determining that a distance of the vehicle 100 to the infrastructure element 160 is less than a radius of the circular coverage area 175.

The infrastructure computer 180 can be programmed, upon receiving a first short-wave request message from a vehicle 100 within a coverage area 175 of a first stationary short-wave antenna 170, to transmit a second short-wave acknowledge message to the vehicle 100 based on a vehicle 100 location.

The computer 110 may be programmed to acknowledge the received request message based on the data included in the received request message. For example, the computer 110 may be programmed to acknowledge the received request message upon determining (i) that the vehicle 100 trajectory m will be within the coverage area 175 for at least a specified amount of time, e.g., 5 seconds, and (ii) that the vehicle 100 is allowed to establish a short-wave communication with the infrastructure element 160, e.g., by comparing to a list of stored certificates in an infrastructure computer 180 memory, etc., to the received certificate data. The computer 180 may be programmed to ignore or decline the received request message upon determining that, e.g., the vehicle 100 is outside the infrastructure element 160 coverage area 175, a certificate is invalid, e.g., not found in the computer 180 memory, etc.

The infrastructure computer 180 may be programmed to predict a second location of the vehicle 100 based on a vehicle 100 location and a vehicle 100 trajectory m. The infrastructure computer 180 may be programmed to determine the second location of the vehicle 100, e.g., in 5 seconds, based on the received trajectory m, the vehicle 100 speed, and the vehicle 100 acceleration. Thus, the computer 110 may be programmed to determine whether the predicted vehicle 100 second location is within the field of view 185 based on (i) the predicted second location, (ii) the view angle α of the antenna 170, and (iii) the axis $A_t$. The computer 180 may be programmed to estimate an area on the ground surface by determining an area within the view angle α and the axis $A_t$, and to determine that the predicted location is within the field of view 185 is the predicted vehicle 100 location is within the estimated area on the ground surface. For example, a cone-shaped radiation pattern 186 may result in an oval-shaped area, i.e., the field of view 185. Based on a location of an intersection of the axis $A_t$, and the view angle α, the computer 180 may determine the area of the field of view 185. Then, the computer 180 may determine based on the determined field of view 185 whether the predicted second location is within the determined field of view 185.

The infrastructure computer 180 may be programmed, upon determining that the predicted second location is outside the field of view 185 but within the coverage area 175 of the antenna 170, to actuate the antenna 170 to change the field of view 185 to include the predicted second location. The infrastructure computer 180 may be programmed to move the axis $A_t$ to be along a second line of communication 145 determined based on the (i) predicted second location of the vehicle 100 and (ii) the infrastructure element 160 location. The computer 180 may be programmed to then transmit a third short-wave message to the vehicle 100 based on the predicted second location of the vehicle 100 in the direction of the second line 145.

In some examples, the infrastructure computer 180 may be programmed to repeatedly, e.g., based on a specified cycle time, to update the field of view 185 such that the vehicle 100 stays within the field of view 185. The cycle time may be a specified value, e.g., 100 milliseconds (ms), or may be dependent on the vehicle 100 speed, etc. For example, the cycle time may be 100 ms for a vehicle 100 speed less than 80 kilometers per hour (kph) and 50 ms for a vehicle 100 speed exceeding 80 kph.

The infrastructure computer 180 may be programmed, upon receiving trajectory m data via the short-wave request message from the vehicle 100, to determine an angle of transmission for the vehicle 100 based on the received trajectory m data. For example, the infrastructure computer 180 may determine the angle of transmission based on the interpolation of data included in the received trajectory m data. Thus, a trajectory m of the vehicle 100 may be utilized by a predictive control algorithm of the infrastructure computer 180 to adjust a beam angle (an angle of the line 145), which can improve the beam alignment to the moving vehicle 100.

The infrastructure computer 180 may be programmed to predict a location of the vehicle 100. For example, the received trajectory m may include a set of n of waypoints of the vehicle 100, as discussed above with respect to Equation (1). The infrastructure computer 180 may be programmed to transmit the next message via short-wave communication to the vehicle 100 at a time t which may be between the time $t_1$ and the time $t_2$. The infrastructure computer 180 may be programmed to implement the Equations (4)-(6) to interpolate the location coordinates $x_t$, $y_t$, $z_t$ of the vehicle 100 communication interface 140 based on the received trajectory m.

$$x_t = \frac{t - t_1}{t_2 - t_1}(x_2 - x_1) \quad (4)$$

$$y_t = \frac{t - t_1}{t_2 - t_1}(y_2 - y_1) \quad (5)$$

$$z_t = \frac{t - t_1}{t_2 - t_1}(z_2 - z_1) \quad (6)$$

The computer 180 may be programmed to determine the direction of antenna 170 for transmitting a next message at the time t based on the determined location coordinates $x_t$, $y_t$, $z_t$ of the vehicle 100 and the location coordinates of the infrastructure element 160 antenna 170. For example, the computer 180 may be programmed to estimate a new imaginary line 145 from the location of the infrastructure element 160 antenna 170 to the location coordinates $x_t$, $y_t$, $z_t$ of the vehicle 100 communication interface 140 at the time t, e.g., as discussed above with respect to Equations (2)-(3). The computer 180 may be programmed to then adjust the direction of the antenna 170 based on the determined new imaginary line 145. The computer 180 may adjust the direction of the antenna 170 by actuating an electromechanical actuator to change the antenna 170 direction and/or actuating a phased-array antenna 170 to change a direction of transmission.

The infrastructure computer 180 may be programmed to transmit data including map data, software updates, etc., to the vehicle 100 while updating a direction or axis $A_t$ of the first stationary antenna 170 based on a vehicle 100 trajectory m. For example, a vehicle 100 computer 110 may be reprogrammed based on a received software update.

Figure 2:
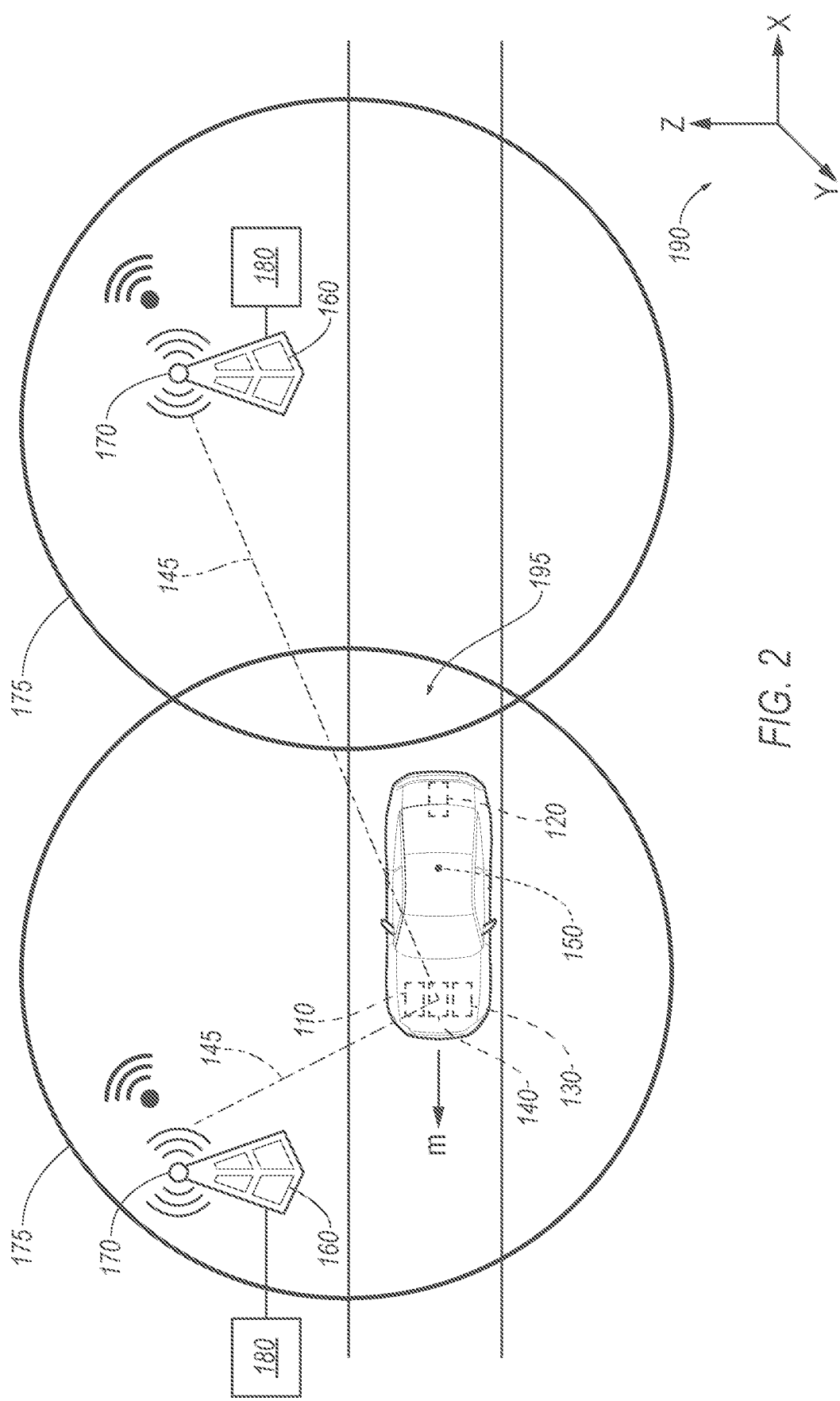
FIG. 2 is a diagram showing the vehicle of FIG. 1 and multiple infrastructure elements with overlapping coverage areas.

FIG. 2 shows the vehicle 100 and multiple infrastructure elements 160 with overlapping coverage areas 175. The vehicle 100 computer 110 may be programmed, upon determining that the vehicle 100 is located outside the coverage area 175 of the first stationary antenna 170, to identify a second stationary antenna 170 based on a received location of the second stationary short-wave antenna 170, and to determine a second line 145 from the vehicle 100 location to a second stationary antenna location 170. The computer 110 may be programmed to transmit a second short-wave request message to the second stationary short-wave antenna 170 based on the second line 145. The computer 110 may be programmed to determine that the vehicle 100 is outside the first coverage area 175 and inside the second coverage area 175 based on the first and second coverage area 175.

In another example, upon determining that the vehicle 100 is within an overlapping area 195 of the coverage areas 175, the computer 110 may be programmed to determine that the vehicle 100 communicates with the second antenna 170 based on the trajectory m of the vehicle 100. The computer 110 may be programmed, upon determining that the trajectory m exits the first coverage area 175 from an overlapping area 195 of the coverage areas 175, to determine that the vehicle 100 selects the second antenna 170 for short-wave communication.

Figure 3:
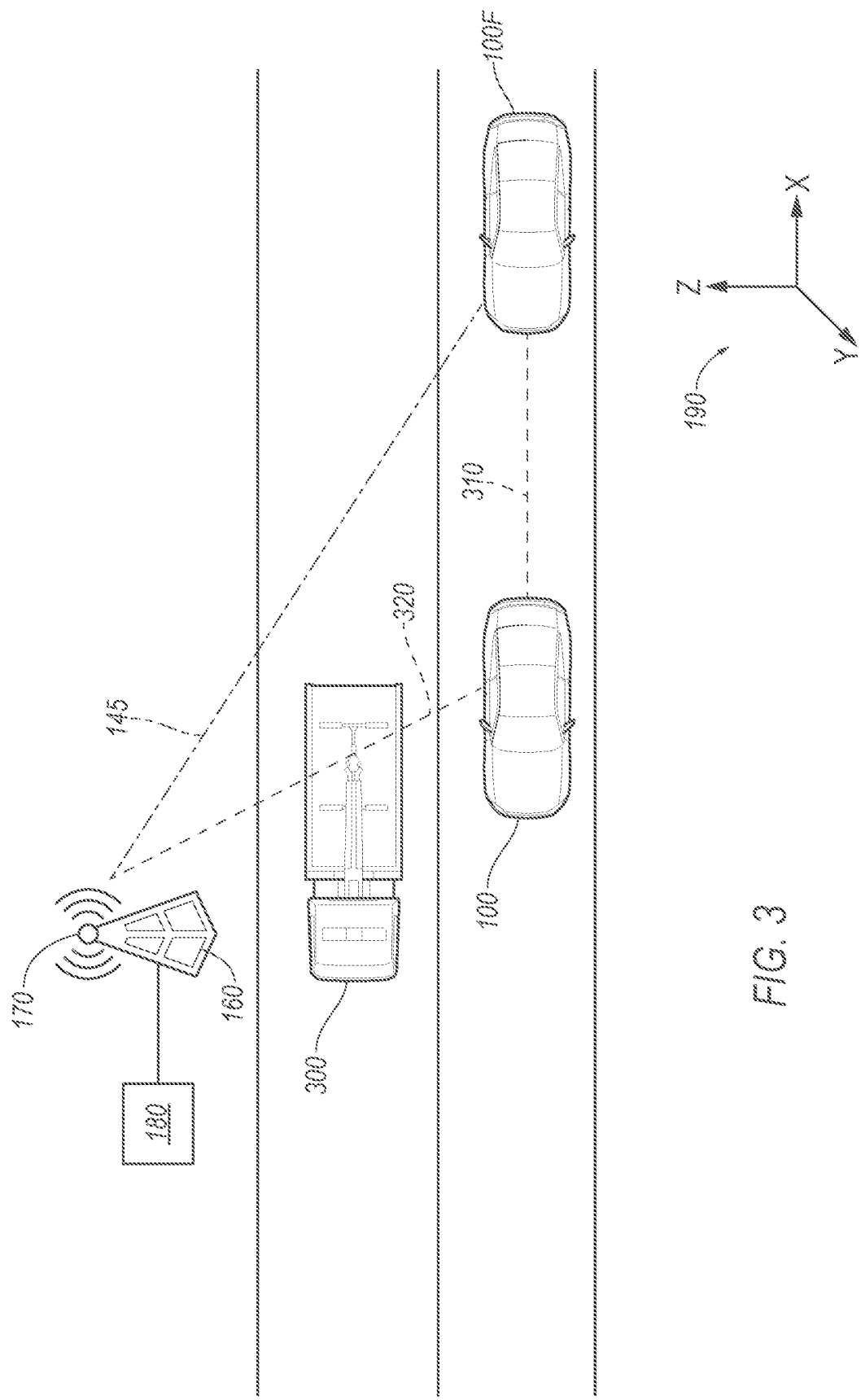
FIG. 3 is a diagram showing a blockage of wireless communication between the infrastructure elements and the vehicle of FIG. 1.

FIG. 3 shows a blockage of wireless communication between the infrastructure element 160 and the vehicle 100.

An object 300 (or obstacle), e.g., a second vehicle, a building, etc., impairs or blocks a short-wave communication between the vehicle 100 and the infrastructure element 160, e.g., blocking a direct line 320 between the vehicle 100 and the infrastructure element 160. The computer 180 may be programmed, upon determining that a line 145 extending from a first stationary short-wave antenna 170 location to a vehicle 100 location is blocked, to identify a message path from the first stationary short-wave antenna 170 to the vehicle 100 location via a second vehicle 100F, and to transmit the third message to the second vehicle 100F including an identifier of the vehicle 100, a number of hops between the vehicle 100 and the first stationary short-wave antenna 170, and a payload. In the present context, the second vehicle 100F may be referred to as the forwarding vehicle 100F. A forwarding vehicle 100F is a vehicle 100 that forwards data between the infrastructure element 160 and the vehicle 100. The forwarding data typically include location coordinates of a vehicle 100 as a receiver of the forwarding data.

The computer 180 may be programmed to determine a blockage based on lack of short-wave communication to the vehicle 100 and/or based on sensor data received from an object detection sensor, e.g., camera sensor, lidar sensor, etc., mounted to the infrastructure element 160 and/or communicatively coupled to the infrastructure element 160. With reference to FIG. 3, the computer 180 may be programmed to detect a blocking object 300 on an imaginary line 320 from the infrastructure element 160 antenna 170 to the vehicle 100.

The computer 180 may be programmed, upon detecting a blockage along the line 320 from the stationary antenna 170 to the vehicle 100, identify a routing path based at least in part on dimensions including a length and a height, and a location of a blocking object 300. A routing path, herein, is a set of lines, e.g., lines 145, 310 in FIG. 3, from the infrastructure element 160 via one or more forwarding vehicles 100F to the vehicle 100. The computer 180 may be programmed to identify a routing path such that the lines of the path are not blocked by any object 300, e.g., the line 145 from the infrastructure element 160 to the forwarding vehicle 100F is not blocked by the object 300. A routing path, herein, is a bidirectional path, i.e., the forwarding vehicle 100F computer 110 may forward messages (i) from the infrastructure element 160 to the vehicle 100, and (ii) from the vehicle 100 to the infrastructure element 160. Table 1 shows an example set of forwarding data.

TABLE 1

| Parameter | Description |
| --- | --- |
| Target vehicle identifier | An identifier of target vehicle in communication with infrastructure element. |
| Target vehicle location | Location coordinates, e.g., GPS coordinates, of the vehicle. |
| Number of hops | A number identifying number of forwarding vehicles in the route. |
| Hops identifier | identifier of forwarding vehicles in middle of routing path. |
| Hopping direction | From infrastructure element or toward infrastructure element. |
| Payload | Data transmitted such as software update, map data, vehicle trajectory, vehicle speed, etc. |

To identify the forwarding vehicle 100F, the infrastructure computer 180 may be programmed to identify, by evaluating location data of other vehicles, a vehicle 100F, e.g., in a same lane in front or behind the vehicle 100, for forwarding data to the vehicle 100. The computer 180 may be programmed to select the forwarding vehicle 100F upon (i) identifying an unblocked line 145 from the infrastructure element 160 to the forwarding vehicle 100, and (ii) identifying an unblocked line of communication 310 from the forwarding vehicle 100F to the vehicle 100. The computer 180 may be programmed to determine that the lines 145, 310 are unblocked, e.g., based on object detection sensor data received from an infrastructure element 160 camera sensor.

A computer 110 of, e.g., the forwarding vehicle 100F, may be programmed, upon receiving forwarding data, e.g., exemplary data of Table 1, from the infrastructure element 160, to transmit a short-wave message to a second vehicle 100 in a direction extending from the vehicle location to the second vehicle 100 location. Thus, the forwarding vehicle 100F computer 110 may be programmed to identify the line 310 from the forwarding vehicle 100F to the vehicle 100 and to transmit the forwarding data to the vehicle 100.

The computer 180 may be programmed to send a message to the forwarding vehicle 100F for forwarding to the vehicle 100 including (i) an identifier and/or location coordinates of the vehicle 100, a number of hops, hopping direction, and payload. A number of hops means a number of forwarding vehicles 100F in a routing path. For example, the number of hops of the routing path shown in FIG. 3 is 1 (one). A hopping direction specifies whether the message is sent from the stationary infrastructure element 160 to the vehicle 100 or from the vehicle 100 to the infrastructure element 160. Payload of the message includes data for the message receiver, e.g., HD map data transmitted from the infrastructure element 160 to the vehicle 100.

As discussed above, a number of hops specifies a number of forwarding vehicles 100F on a routing path. For example, the computer 180 may be programmed to determine that the routing path further includes a third vehicle 100F (not shown) in addition to the second vehicle 100F upon determining a second line from the second vehicle 100F to the vehicle 100 is blocked.

Figure 4:
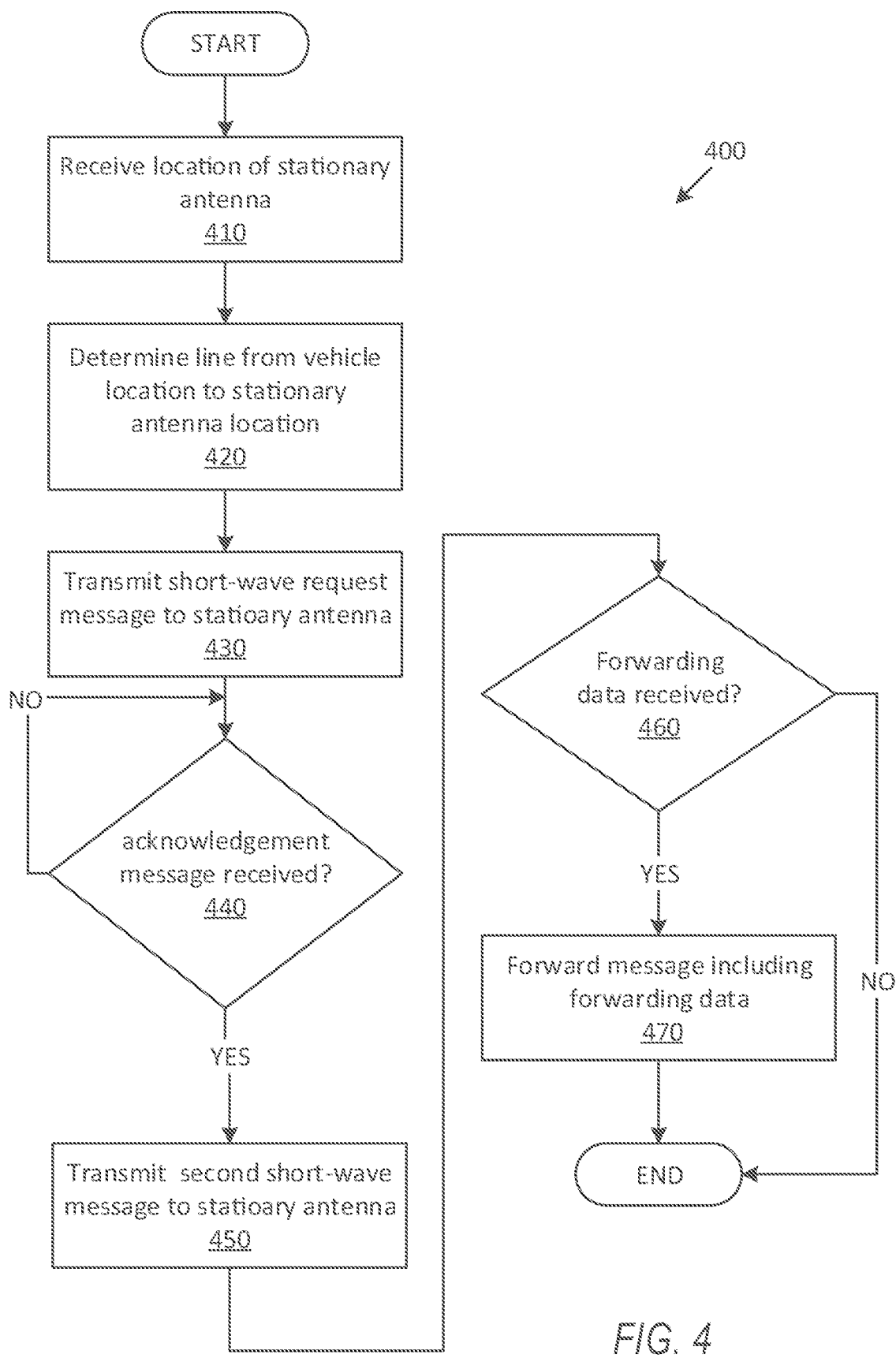
FIG. 4 is a flowchart of an exemplary process for operating the vehicle.

FIG. 4 is a flowchart of an exemplary process 400 for operating the vehicle. A vehicle 100 computer 110 may be programmed to execute blocks of the process 400.

The process 400 begins in a block 410, in which the computer 110 receives location data of stationary antennas 170, e.g., from an infrastructure computer 180 and/or any remote computer 180 communicating via a long-wave V2X communication, e.g., Wi-Fi, cellular, etc. The computer 110 may be programmed to receive data, via a long-wave communication network, e.g., Wi-Fi, cellular, WAN, etc., including location coordinates of infrastructure element(s) 160 antenna 170, coverage area(s) 175 of antenna(s) 170, etc.

Next, in a block 420, the computer 110 determines a line 145 from vehicle 100 location to a stationary antenna 170 location. The computer 110 may be programmed to select the infrastructure element 160 including the stationary antenna 170 based on the location and/or coverage area 175 of the antenna 170. Further, the computer 110 may be programmed to select the antenna 170 based on a trajectory m of the vehicle 100, as discussed with reference to FIG. 2.

Next, in a block 430, the computer 110 may be programmed to transmit a short-wave request message to a stationary antenna 170 to establish short-wave communications. The computer 110 may be programmed to transmit, e.g., via the communication interface 140, the short-wave message in the direction of the identified line 145.

Next, in a decision block 440, the computer 110 determines whether an acknowledgment message is received from the infrastructure element 160 computer 180. The computer 110 may be programmed to determine that no acknowledgment is received if no message is received from the infrastructure computer 180 within a specified time, e.g., 200 ms, from the time of transmitting the request message. If the computer 110 determines that an acknowledgment message is received, then the process 400 proceeds to a block 450; otherwise returns to the decision block 440, or alternatively the process 400 ends, although not shown in FIG. 4.

In the block 450, the computer 110 transmits a second short-wave message to stationary antenna 170. The computer 110 may be programmed to send vehicle data including vehicle 100 speed, vehicle 100 trajectory m, diagnostic data, etc.

Next, in a decision block 460, the computer 110 determines whether forwarding data, including target identifier, number of hops, etc., is received from an infrastructure element 160 computer 180. The computer 110 may be programmed to determine that the received short-wave message includes forwarding data based on identifying a target identifier, e.g., another vehicle identifier different from the vehicle 100 identifier. If the computer 110 determines that forwarding data is received, the process 400 proceeds to a block 470, otherwise the process returns to the decision block 460.

In the block 470, the computer 110 transmits a message including the payload and forwarding data, based on the target identifier included in the received forwarding data, e.g., exemplary data of Table 1. The computer 110 may be programmed to transmit the message based on hopping direction of communication, target vehicle identifier, number of hops, forwarding vehicle(s) identifier. For example, with reference to FIG. 3, the computer 110 of the vehicle 100F may be programmed, based on receiving forwarding data specifying an identifier of the vehicle 100 as the target vehicle, and hopping direction specifying "from infrastructure to target vehicle," to send a message to the vehicle 100 including the forwarding data. In yet another example, upon receiving forwarding data from the vehicle 100 including hopping direction "to the infrastructure element," to transmit a message to the infrastructure element 160 including the forwarding data.

Following the block 470, the process 400 ends, or alternatively returns to the block 410.

Figure 5A:
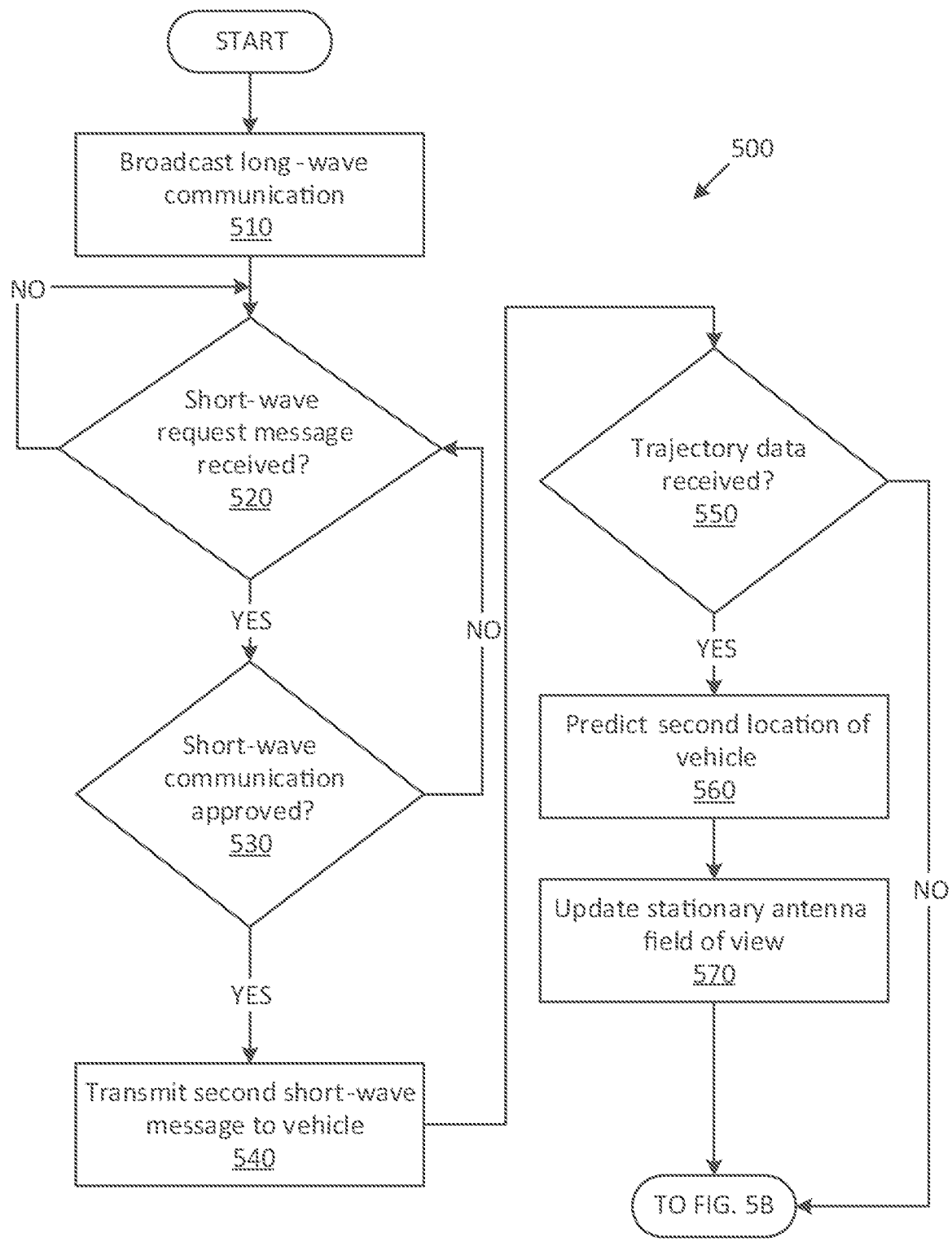
FIGS. 5A-5B are a flowchart of an exemplary process for operating the infrastructure element.
Figure 5B:
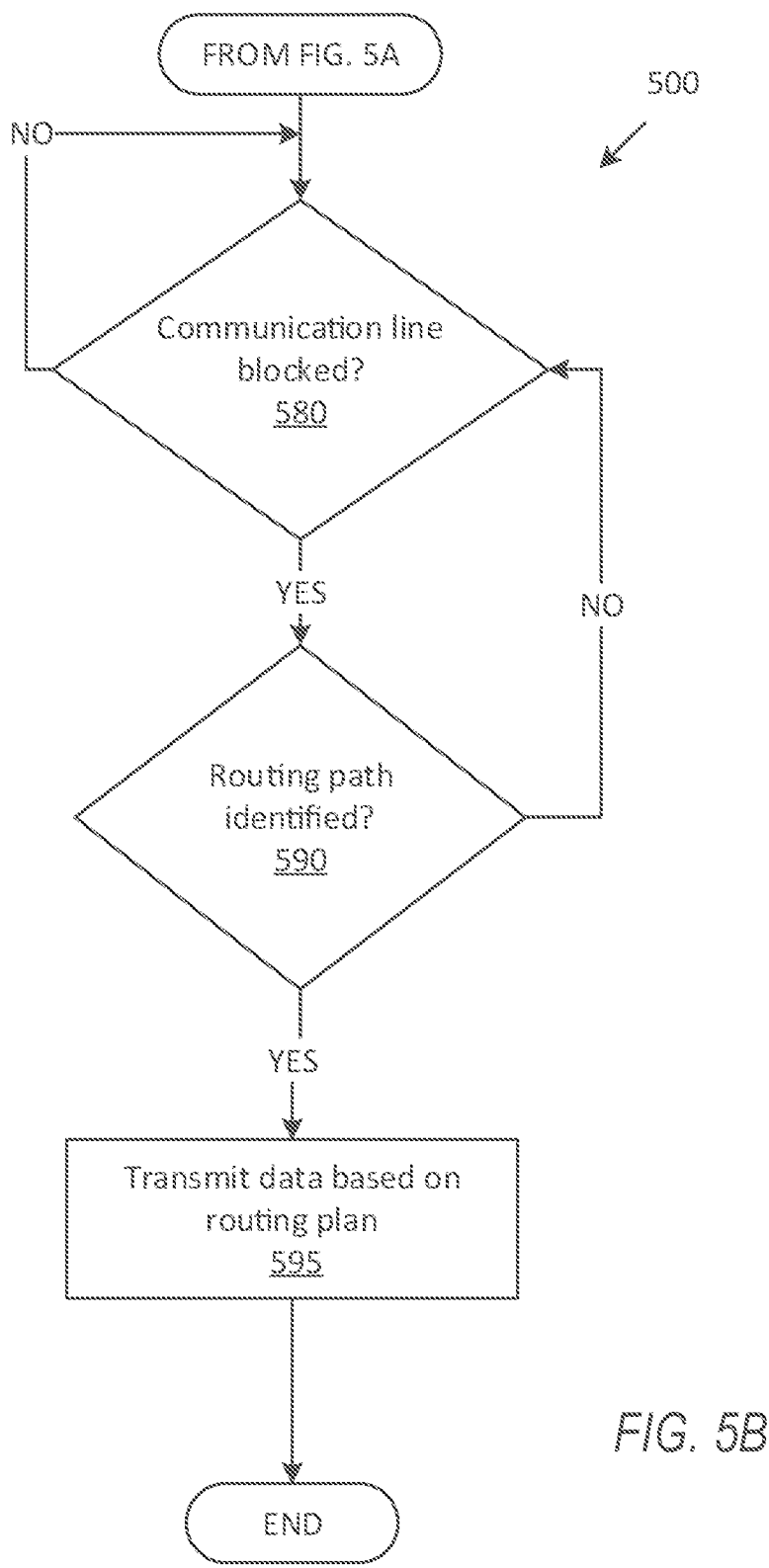

FIGS. 5A-5B are a flowchart of an exemplary process 500 for an infrastructure element 160 computer 180. The computer 180 may be programmed to execute blocks of the process 500.

With reference to FIG. 5A, the process 500 begins in a block 510, in which the computer 180 broadcasts a location and/or a coverage area 175 of one or more infrastructure elements 160. Additionally or alternatively, a remote computer may be programmed to broadcast location and/or coverage area 175 of the infrastructure element(s) 160.

Next, in a decision block 520, the computer 180 determines whether a short-wave request message is received from a vehicle 100 computer 110. If the computer 180 determines that a request message is received, then the process 500 proceeds to a decision block 430; otherwise the process 500 ends, although not shown in FIG. 5A In the decision block 530, the computer 180 determines whether to approve the received request for establishing short-wave communication with the vehicle 100. The computer 180 may be programmed to determine, based on a vehicle 100 location, vehicle 100 trajectory m, etc., whether to approve the request. For example, the computer 180 may approve the request upon determining that the vehicle 100 is in the coverage area 175 of the infrastructure element 160 and, determining, based on the trajectory m, the vehicle 100 will stay in the coverage area 175 for at least a specified amount of time, e.g., 5 seconds. If the computer 180 determines to approve the request, the process 500 proceeds to a block 540; otherwise the process 500 returns to the decision block 520.

In the block 540, the computer 180 transmits a second short-wave message to the vehicle 100. The computer 180 may be programmed to transmit a message including payload such as a software update, HD map data, weather data, etc.

Next, in a decision block 550, the computer 180 determines whether trajectory m data has been received from the vehicle 100. The trajectory m of the vehicle 100 may be included in received short-wave messages from the vehicle 100. If the computer 180 determines that vehicle 100 trajectory m data is received, then the process 500 proceeds to a block 560; otherwise the process 500 proceeds to a block 580 (FIG. 5B).

In the block 560, the computer 180 predicts a second location of the vehicle 100 based on the trajectory m. The computer 110 may be programmed to implement Equations (4)-(6) to predict the second location of the vehicle 100 at a time t, as discussed above.

Next, in a block 570, the computer 180 updates the field of view 185 of the antenna 170 based on the predicted second location of the vehicle 100. The computer 180 may be programmed to actuate an electromechanical actuator to move the axis $A_r$ of the antenna 170 and/or adjust a phased-array antenna 170 to move the axis $A_r$. The computer 180 may be programmed to transmit a next short-wave message to the vehicle 100 upon updating the field of view 185.

With reference to FIG. 5B, next in a decision block 580, which can be reached from either of blocks 550, 570, the computer 180 determines whether a line of communication from the infrastructure element 160 to the vehicle 100 is blocked. If the computer 180 determines that a line 145 from the infrastructure element 160 to the vehicle 100 is blocked, the process 500 proceeds to a decision block 590; otherwise the process 500 returns to the decision block 580, or alternatively returns to the block 510.

In the decision block 590, the computer 180 determines whether a routing path from the infrastructure element 160 to the vehicle 100 is identified. If the computer 180 identifies a routing path from the infrastructure element 160 to the vehicle 100, then the process 500 proceeds to the block 595; otherwise the process 500 returns to the decision block 580.

In the block 595, the computer 180 transmits data based on the identified routing plan. The computer 180 may be programmed to transmit a message to a forwarding vehicle 100 including forwarding data. Following the block 595, the process 500 ends, or alternatively returns to the block 510, although not shown in FIGS. 5A-5B.

The article "a" modifying a noun should be understood as meaning one or more unless stated otherwise, or context requires otherwise. The phrase "based on" encompasses being partly or entirely based on.

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random-access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random-access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH, an EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A vehicle computer, comprising a processor and a memory, the memory storing instructions executable by the processor to:

receive a location of a first stationary directional short-wave antenna;

determine a line from a vehicle location to the location of the first stationary antenna;

transmit a short-wave request message to the first stationary short-wave antenna based on the determined line, the message including vehicle data; and upon receiving a short-wave acknowledgement message from the first stationary short-wave antenna, transmit a second short-wave message including vehicle data.

2. The vehicle computer of claim 1, wherein the instructions further include instructions to:
receive the location of the first stationary short-wave antenna and a coverage area of the first stationary antenna via a long-wave wireless communication network; and
upon determining based on the location of the first stationary short-wave antenna that the vehicle is within the coverage area of the first stationary antenna, transmit the short-wave request message to the first stationary short-wave antenna.

3. The vehicle computer of claim 1, wherein the instructions further include instructions to transmit a short-wave request message to the first stationary short-wave antenna by actuating a vehicle phased-array short-wave antenna.

4. The vehicle computer of claim 1, wherein the instructions further include instructions to:
upon determining that the vehicle is located outside the coverage area of the first stationary antenna, identify a second stationary antenna based on a received location of the second stationary short-wave antenna; and
determine a second line from the vehicle location to a second stationary antenna location; and
transmit a second short-wave request message to the second stationary short-wave antenna based on the second line.

5. The vehicle computer of claim 1, wherein the instructions further include instructions to:
upon determining that vehicle data include forwarding data, wherein the forwarding data include location coordinates of a second vehicle as a receiver of the forwarding data, transmit a short-wave message to the second vehicle in a direction extending from the vehicle location to a second vehicle location.

6. The vehicle computer of claim 1, wherein the vehicle data include a vehicle location, a vehicle trajectory of movement, and a vehicle status.

7. A system, comprising a processor and a memory, the memory storing instructions executable by the processor to:
upon receiving a first short-wave request message from a vehicle within a coverage area of a first stationary short-wave antenna, transmit a second short-wave acknowledge message to the vehicle based on a vehicle location;
predict a second location of the vehicle based on a vehicle location and a vehicle trajectory;
transmit a third short-wave message to the vehicle based on the predicted second location of the vehicle;
upon determining that a line extending from a first stationary short-wave antenna location to a vehicle location is blocked, identify a message path from the first stationary short-wave antenna to the vehicle location via a second vehicle; and
transmit the third message to the second vehicle including an identifier of the vehicle, a number of hops between the vehicle and the first stationary short-wave antenna, and a payload.

8. The system of claim 7, wherein the instructions further include instructions to transmit the acknowledge message based on a vehicle location and a trajectory of the vehicle.

9. The system of claim 7, wherein the instructions further include instructions, upon detecting a blockage along the line from the first stationary antenna to the vehicle, to identify a routing path based at least in part on dimensions including a length and a height, and a location of a blocking object.

10. The system of claim 9, wherein the instructions further include instructions to determine that the routing path further includes a third vehicle in addition to the second vehicle upon determining a second line from the second vehicle to the vehicle is blocked.

11. The system of claim 7, wherein the instructions further include instructions to transmit data including map data or software update to the vehicle while updating a direction of the first stationary antenna based on a vehicle trajectory.

12. The system of claim 7, wherein the instructions further include instructions to adjust a direction of the first stationary antenna based on an imaginary line, from the first stationary short-wave antenna to the vehicle, by actuating a phased array antenna included in the first stationary antenna.

13. The system of claim 7, wherein the instructions further include instructions to receive trajectory data via the short-wave message from the vehicle and to determine an angle of transmission for the vehicle based on the received trajectory data.

14. The system of claim 13, wherein the instructions further include instructions to determine the angle of transmission based on interpolation of data included in the received trajectory data.

15. The system of claim 7, wherein the coverage area of the first stationary antenna is determined based on a location of the first stationary short-wave antenna and a field of view of the first stationary antenna.

16. The system of claim 7, further comprising a long-wave antenna, wherein the instructions further include instructions to broadcast a location of a first stationary directional short-wave antenna.

17. The system of claim 7, wherein the instructions further include instructions to actuate a second stationary short-wave antenna to transmit a short-wave message to the vehicle upon determining that the vehicle has entered a second station antenna coverage area.

18. A system, comprising:
a vehicle computer, programmed to:
receive a location of a first stationary directional short-wave antenna;
determine a line from a vehicle location to the location of the first stationary antenna;
transmit a short-wave request message to the first stationary short-wave antenna based on the determined line, the message including vehicle data; and
upon receiving a short-wave acknowledgment message from the first stationary short-wave antenna, transmit a second short-wave message including vehicle data, and a stationary computer, programmed to:
upon receiving a first short-wave request message from a vehicle within a coverage area of a first stationary short-wave antenna, transmit a second short-wave acknowledge message to the vehicle based on a vehicle location;
predict a second location of the vehicle based on a vehicle location and a vehicle trajectory;
transmit a third short-wave message to the vehicle based on the predicted second location of the vehicle;
upon determining that a line extending from a first stationary short-wave antenna location to a vehicle location is blocked, identify a message path from the first stationary short-wave antenna to the vehicle location via a second vehicle; and transmit the third message to the second vehicle including an identifier of the vehicle, a number of hops between the vehicle and the first stationary shortwave antenna, and a payload.

\* \* \* \* \*